United States Patent [19]

Maeda et al.

[11] Patent Number: 5,309,108
[45] Date of Patent: May 3, 1994

[54] METHOD OF INSPECTING THIN FILM TRANSISTOR LIQUID CRYSTAL SUBSTRATE AND APPARATUS THEREFOR

[75] Inventors: Shunji Maeda, Yokohama; Hitoshi Kubota, Fujisawa; Makoto Ono, Yokohama, all of Japan

[73] Assignee: Hitachi, Ltd., Tokyo, Japan

[21] Appl. No.: 921,583

[22] Filed: Jul. 30, 1992

[30] Foreign Application Priority Data

| Jul. 30, 1991 | [JP] | Japan | 3-189994 |
| Nov. 1, 1991 | [JP] | Japan | 3-287560 |
| Mar. 3, 1992 | [JP] | Japan | 4-045627 |

[51] Int. Cl.⁵ .................. G01R 31/02; G06K 9/00
[52] U.S. Cl. ..................... 324/501; 324/537; 324/702; 324/158 F; 340/600; 382/8
[58] Field of Search ............ 324/501, 512, 522, 525, 324/537, 702, 158 F; 340/600, 661, 784; 250/492.2; 382/8

[56] References Cited

U.S. PATENT DOCUMENTS

| 3,350,702 | 10/1967 | Herman | 324/501 |
| 3,991,302 | 11/1976 | Danner | 340/595 |
| 4,628,531 | 12/1986 | Okamoto et al. | 382/8 |
| 4,843,312 | 6/1989 | Hartmann et al. | 324/158 R |
| 4,940,934 | 7/1990 | Kawaguchi et al. | 324/158 R |
| 5,057,775 | 10/1991 | Hall | 324/158 R |
| 5,073,754 | 12/1991 | Henley | 324/529 |
| 5,146,509 | 9/1992 | Hara et al. | 382/8 |
| 5,175,504 | 12/1992 | Henley | 324/501 |

Primary Examiner—Kenneth A. Wieber
Assistant Examiner—Christopher Tobin
Attorney, Agent, or Firm—Antonelli, Terry, Stout & Kraus

[57] ABSTRACT

The invention relates to a method of inspecting and correcting a thin film transistor liquid crystal substrate and an apparatus therefor, where a plurality of scan lines and signal lines are connected electrically in common at each one terminal side respectively, and an infrared image outside the pixel domain is detected after lapse of a prescribed time from the time point of applying voltage between the scan lines and the signal lines, and an infrared image outside the pixel domain is detected after lapse of a prescribed time from the time point of stopping the voltage application, and the scan lines and the signal lines relating to variation of the heating state are detected from difference or quotient between an infrared image at the voltage applying state and an infrared image at the stopping state of voltage application, thereby a pixel address with a shortcircuit defect occurring is specified. If an image part being equal to the set threshold value or more does not exist in the difference infrared image in the pixel address, a wiring pattern position in the pixel address is detected from a visible image of the pixel address, and this wiring pattern and one from a neighboring pixel address are compared to detect a short circuit defect which can be removed by laser.

9 Claims, 12 Drawing Sheets

METHOD OF INSPECTING THIN FILM TRANSISTOR LIQUID CRYSTAL SUBSTRATE AND APPARATUS THEREFOR

BACKGROUND OF THE INVENTION

The present invention relates to an inspection method of detecting defects of a pattern to be inspected and an apparatus therefor, and more particularly to a method and an apparatus for inspecting a thin film transistor liquid crystal substrate used for a liquid crystal display apparatus, as a pattern to be inspected.

FIG. 1 shows an example of an electric wiring construction of a thin film transistor active matrix substrate (hereinafter referred to simply as "thin film transistor liquid crystal substrate") in the case of arrangement in 5×5 pixels. As seen from this, the thin film transistor liquid crystal comprises scan lines 11-15 and signal lines 21-25, and intersections between the signal lines and the scan lines are provided with a thin film transistor 7 and a transparent pixel electrode 8 formed on a glass substrate. When the thin film transistor liquid crystal substrate and a common electrode substrate are opposed in parallel to each other, a liquid crystal display apparatus is basically constructed by enclosing a liquid crystal between both substrates. In FIG. 1, numerals 11p-15p designates electrode terminal pads corresponding to the scan lines 11-15, and numerals 21p-25p designate electrode terminal pads corresponding to the signal lines 21-25.

In the thin film transistor liquid crystal substrate constructed as above described, if a short circuit defect 3 is produced between the scan line 13 and the signal line 23 for example, the display failure along the scan line 13 and the signal line 23 is produced linearly. The short circuit defect 3 includes a short circuit defect 3a which occurs at an intersection point between the scan line and the signal line and a short circuit defect 3b which occurs within the thin film transistor 7 as shown in FIG. 2(a). As measure for correcting these short circuit defects 3a and 3b, a method of providing the intersection between the signal line and the scan line and the thin film transistor 7 plurally has been considered as shown in FIG. 2(b). According to this method, the wiring is cut at wiring cutting positions 9a, 9b such that the short circuit defects 3a, 3b can be corrected. When this method is actually applied, however, the position of the short circuit defect must be previously specified.

FIG. 3 shows an inspection method in the prior art confirming whether a short circuit defect exists or not. According to this inspection method, one end of each of the scan lines 11-15 is connected in common through the scan line electrode terminal pads 11p-15p, external wirings 11d-15d, and a connection wiring 1c, and on the other hand, one end of each of the signal lines 21-25 is connected in common through signal line electrode terminal pads 21p-25p, external wirings 21d-25d, and a connection wiring 2c. In such a connection state, if probes are contacted with the connection wirings 1c, 2c, and a voltage V is applied between the scan lines 11-15 and the signal lines 21-25, and a current value is measured by a current meter 4, a decision can be effected regarding whether a short circuit defect exists or not. According to this method, however, even if it can be confirmed that a short circuit defect exists, the pixel address of the short circuit defect producing pixel cannot be specified.

In order to specify the pixel address, when the thin film transistor liquid crystal substrate having the wiring structure shown in FIG. 1 is used as an object, measurement of a current value in the state of applying the voltage V only to one scan line and one signal line at a time may be carried out for all of the combinations of the scan lines and the signal lines in sequence. According to this method, however, since the current value must the number of signal lines, in order to specify the pixel address of the short circuit defect producing pixel, not only is the current measuring work troublesome but also much time is required.

In addition to such disadvantages, damage of an electrode terminal part due to contact of a probe becomes a problem. In order to reduce the inspection time, many probes may be contacted simultaneously such that the pixel address of the short circuit defect producing pixel can be quickly specified. However, in the thin film transistor liquid crystal substrate where the intersection between the scan line and the signal line and the thin film transistor are provided plurally as shown in FIG. 2(b), it cannot be specified at which intersection between the scan line and the signal line or at which thin film transistor a short circuit defect exists.

The inspection time, Japanese patent application laid-open No. 1-154092 discloses a method of detecting defects from a coloring state of a color film of an electrochromic display panel. According to this, since the color film is in a non-coloring state or a coloring state depending on the conduction state of each pixel electrode, the defective pixel can be specified. However, according to this method, since the pixel electrode of the thin film transistor liquid crystal substrate and the color film of the electrochromic display panel must be conduction-connected through an electrolyte, a problem of contamination remains in the case of using a liquid electrolyte, and a problem of damage remains in the case of using a solid electrolyte.

As described above, in the prior art, in actual use, the short circuit defect on the thin film liquid crystal substrate cannot be detected rapidly with high accuracy without causing damage to the substrate itself. Even if the pixel when the intersection between the scan line and the signal line and the thin film transistor itself are pluralized for each pixel, it cannot be specified at which intersection or at which thin film transistor the short circuit defect exists.

SUMMARY OF THE INVENTION

An object of the present invention is to provide an inspection method of a thin film transistor liquid crystal substrate and an apparatus therefor, wherein various short circuit defects existing on a thin film transistor liquid crystal substrate can be detected rapidly with high accuracy at non-contact state with the substrate.

Another object of the present invention is to provide an inspection method of a thin film transistor liquid crystal substrate and an apparatus therefor, wherein even in a thin film transistor liquid crystal substrate with an intersection between a scan line and a signal line and a thin film transistor itself are pluralized, it can be specified to which intersection or to which thin film transistor a shortcircuit defect exists.

Another object of the present invention is to provide an inspection method of a thin film transistor liquid crystal substrate, wherein various short circuit defects existing between a scan line and a signal line on a thin film transistor liquid crystal substrate, between scan lines and between signal lines can be detected rapidly at non-contact state with the substrate.

Another object of the present invention is to provide an inspection method of a thin film transistor liquid crystal substrate, wherein shortcircuit defect positions existing between a scan line and a signal line on a thin transistor liquid crystal substrate, between scan lines and between signal lines can be detected rapidly at large S/N and at non-contact state with the substrate.

Another object of the present invention is to provide an inspection method of a thin film transistor liquid crystal substrate, wherein shortcircuit defect positions existing in a pixel domain on a thin film transistor liquid crystal substrate can be detected rapidly at non-contact state with the substrate.

Another object of the present invention is to provide an inspection method of a thin film transistor liquid crystal substrate, wherein even in a thin film transistor liquid crystal substrate with an intersection between a scan line and a signal line and a thin film transistor itself are pluralized, a pixel address with shortcircuit defects existing is specified, and then the shortcircuit defect positions within the pixel address can be detected rapidly at non-contact state with the substrate.

Another object of the present invention is to provide an inspection apparatus of a thin film transistor liquid crystal substrate, wherein various inspection methods of a thin film transistor liquid crystal substrate as above described can be carried out easily.

In order to achieve the foregoing objects, the present invention adopts following characteristic items.

(1) Voltage is applied between a scan line/scan lines and a signal line/signal lines of a thin film transistor liquid crystal substrate, and variation of heating state due to current flowing through a shortcircuit defect part of the scan line and the signal line is detected by an infrared image detector.

(2) Scan lines and signal lines of the thin film transistor liquid crystal substrate are electrically connected commonly at each one terminal respectively.

(3) Regarding scan lines existing between a terminal connecting the scan lines electrically and a pixel domain and signal lines existing between a terminal connecting the signal lines electrically and a pixel domain, variation of the heating state before and after the voltage application is calculated from the detected infrared images, thereby the pixel address with the shortcircuit defect occurring is specified.

(4) Regarding a pixel part with a short circuit defect occurring, variation of the heating state before and after the voltage application is calculated from the detected infrared images, thereby the position with the shortcircuit defect occurring is specified.

(5) Variation of the heating state before and after the voltage application is detected using difference or quotient of the infrared images.

(6) Regarding the pixel address with the short circuit defect occurring, a visible image of a wiring pattern of the thin film transistor liquid crystal substrate is referred to and the position with the short circuit defect occurring is specified.

(7) Detection is carried out using an infrared image detector with its sensitivity decreasing towards the periphery of the light receiving section.

Since there is resistance of about several ten megaohms usually between a scan line and a signal line on a thin film transistor substrate in normal state, even if voltage of about several ten volts is applied between the scan line and the signal line, little current flows there. On the contrary, if a short circuit defect exists between the scan line and the signal line within the thin film transistor liquid crystal substrate, current flows through the short circuit defect part, and phenomenon occurs in that the short circuit defect part and its neighboring part having a resistance value larger than that of the normal wiring part are heated. If the heating state is detected by the infrared image detector, the image having a value proportional to the product of the emissivity $\epsilon$ and the several power of the temperature T, for instance fourth power is obtained. Regarding a value of the emissivity $\epsilon$, since glass has a value nearly equal to 1 and chromium or aluminium being a wiring pattern has a value nearly equal to 0, the image to be observed is liable to be affected by difference of the emissivity. Consequently, in order to detect the quite little heat, with high accuracy, influence due to the emissivity must be removed. In this case, images are detected before and after the voltage application, and difference (quotient) is detected, thereby even delicate state variation caused by quite little heating in the shortcircuit defect part can be detected and the shortcircuit position can be specified accurately.

Also regarding a pixel address where a short circuit defect occurs actually, if a visible image of a wiring pattern is referred to, the position with the short circuit defect occurring can be easily specified.

Further, in the temperature distribution of the heating part, the temperature falls gently getting away from the heating center. Consequently, if the temperature is detected using the infrared image detector whose sensitivity is decreased towards the periphery of the light receiving part, the peak position of the heating center can be determined accurately.

Also the present invention is in an inspection method or an inspection apparatus where voltage, heat, electric field or the like is applied from the outside and the state variation is detected, more particularly in an inspection method or an inspection apparatus where means for determining the position of the image is provided, and it is noticed that the position relation between the detected image and the reference image before the application is determined, thereby the position of the point or the domain with the state varying can be calculated accurately. Further the present invention is characterized in that the reference image is the image before applying the voltage or the like, or a part thereof.

That is, in order to achieve the foregoing objects, the present invention is constructed as follows.

(1) Voltage is applied between a scan line and a signal line of a thin film transistor substrate, and variation of heating state due to current flowing through a short circuit defect part of the scan line and the signal line is detected by an infrared image detector.

(2) Scan lines and signal lines of the thin film transistor liquid crystal substrate are electrically connected commonly at each one terminal respectively.

(3) Variation of the heating state before and after the voltage application is calculated from the detected infrared images, thereby the position with the short circuit defect occurring is specified.

(4) Position relation between the infrared image and the reference image before the voltage application is determined, thereby the heating position can be calculated accurately.

(5) Position relation of images is carried out, for example, by matching of the images.

Since there is resistance of about several ten megaohms between a scan line and a signal line on a thin film transistor substrate in normal state, even if voltage of about several ten volts is applied between the scan line and the signal line, little current flows there. On the contrary, if a shortcircuit defect exists between the scan line and the signal line within the thin film transistor substrate, current flows through the shortcircuit defect part thereby the shortcircuit part and its neighboring part having larger resistance value than that at the normal wiring part are heated. If this is detected by the infrared image detector, image having value of sum of product of function R(T) of a temperature T of the object and the emissivity $\epsilon$ and product of the function R(Ta) of the ambient temperature and $(1-\epsilon)$ can be obtained. Regarding a value of the emissivity $\epsilon$, since glass has a value nearly equal to 1 and chromium or aluminium being a wiring pattern has a value nearly equal to 0, the image to be observed is liable to be affected by the outside field. Consequently, in order to detect quite little heating with high accuracy, the influence of the outside field must be removed. So images are detected before and after the voltage application and difference between the images is detected, thereby the influence of the outside field can be removed and even delicate state variation caused by quite little heating of the shortcircuit part can be detected.

However, the infrared image detector is usually of point type, and is constituted in most cases so that two-dimensional image is detected by scanning a mirror. In this constitution, the reproducibility cannot be guaranteed in such condition that the scan position is drifted with lapse of time. If a lens has strain, the shortcircuit position cannot be calculated accurately even in two-dimensional type. Therefore, the infrared image before the voltage application and the reference infrared image are positioned thereby the correct shortcircuit position can be measured.

The present invention is in that when voltage is applied between a scan line and a signal line, between scan lines or between signal lines in a thin film transistor liquid crystal substrate, variation of the heating state due to current flowing between the scan line and the signal line, between the scan lines or between the signal lines is detected from difference or quotient between an infrared image at the voltage application state and an infrared image at the voltage application stopping state, thereby a shortcircuit defect existing between the scan line and the signal line, between the scan lines or between the signal lines is detected. More preferably, an infrared image is detected after lapse of a prescribed time from the time point of applying voltage between the scan line and the signal line, between the scan lines or between the signal lines, and on the other hand, an infrared image is detected after lapse of a prescribed time from the time point of stopping the voltage application, and variation of the heating state due to current flowing between the scan line and the signal line, between the scan lines or between the signal lines is detected from difference or quotient (ratio) between the infrared image at the voltage application state and the infrared image at the voltage application stopping state, thereby the short circuit defect is detected.

Also the present invention is in that an infrared image is detected after lapse of a prescribed time from the time point of applying voltage between a scan line and a signal line, between scan lines or between signal lines in a thin film transistor liquid crystal substrate, and on the other hand, an infrared image is detected after lapse of a prescribed time from the time point of stopping the voltage application, the above-mentioned detections being repeated plural times, and variation of the heating state due to current flowing between the scan line and the signal line, between the scan lines or between the signal lines is detected from difference or quotient between plural overlapped infrared images at the voltage application state and plural overlapped infrared images at the voltage application stopping state, thereby a shortcircuit defect existing between the scan line and the signal line, between the scan lines or between the signal lines is detected.

Also the present invention is in that when a plurality of scan lines and signal lines in a thin film transistor liquid crystal substrate are electrically connected commonly at each one terminal side, an infrared image outside the pixel domain is detected after lapse of a prescribed time from the time point of applying voltage between the scan lines and the plural lines, and on the other hand, an infrared image outside the pixel domain is detected after lapse of a prescribed time from the time point of stopping the voltage application, and scan lines and signal lines regarding variation of the heating state are detected from difference or quotient between an infrared image at the voltage application state and an infrared image at the stopping state of voltage application, thereby coordinates with the shortcircuit defect occurring are detected at the specified state.

Also the present invention is in that after a pixel address with a shortcircuit defect occurring is detected at the specified state, a difference infrared image at the pixel address is detected as difference (subtraction) or quotient between an infrared image detected after lapse of a prescribed time from the time point of applying voltage between a scan line and a signal line and an infrared image detected after lapse of a prescribed time from the time point of stopping the voltage application and then compared with a set threshold value, thereby the shortcircuit defect position is detected, or a wiring pattern position at the pixel address is detected from a visible image of the pixel address, and on the other hand, a wiring pattern at the pixel address is compared with a wiring pattern at an neighboring pixel address, thereby the shortcircuit defect position is detected.

Also the present invention is provided at least with a stage system holding a thin film transistor liquid crystal substrate with X, Y, Z direction positions and rotational position $\theta$ within the X, Y horizontal plane being arbitrary state, so that image at an arbitrary position on the thin film transistor liquid crystal substrate can be optically detected; a voltage application system where voltage can be applied between a scan line and a signal line, between scan lines or between signal lines in the thin film transistor liquid crystal substrate held on the stage system; an illumination system illuminating the thin film transistor liquid crystal substrate with a visible light so that a wiring pattern at any position on the thin film transistor liquid crystal substrate is addressed as a visible image; an infrared image detection processing system where an infrared image at any position on the thin film transistor liquid crystal substrate held on the stage system is detected after lapse of prescribed times respectively from the time point of starting the voltage application and the time point of stopping the voltage application and subjected to prescribed image processing, thereby determination of existence of a shortcircuit defect occurring pixel address and specifying of the short circuit defect position within the shortcircuit defect producing pixel address are carried out; and a visible image detection processing system where a wiring pattern at any position on the thin film transistor liquid crystal substrate held on the stage system is detected as a visible image and subjected to prescribed image processing, thereby the short circuit defect position within the shortcircuit defect producing pixel address is specified.

The invention intends to detect a shortcircuit defect from a difference image between an infrared image at the state of applying voltage between a scan line and a signal line, between scan lines or between signal lines and an infrared image at the stopping state of voltage application. In this case, the infrared image is detected within a short time after stopping the voltage application, thereby variation of brightness in the vicinity of the shortcircuit part caused by the thermal diffusion is canceled and influence due to the thermal diffusion is compensated and then determination of existence of a shortcircuit defect or its position specifying is carried out with high accuracy. More concretely, an infrared image is detected after lapse of a prescribed time from the time point of applying voltage between the scan line and the signal line, between the scan lines or between the signal lines, and on the other hand, an infrared image is detected after lapse of a prescribed time from the time point of stopping the voltage application, and variation of the heating state due to current flowing between the scan line and the signal line, between the scan lines or between the signal lines is detected from difference or quotient between an infrared image at the voltage application state and an infrared image at the stopping state of voltage application, thereby the shortcircuit defect is detected.

In this case, the infrared image detection timing is determined more concretely and individually by a current value or heating quantity detected previously, and in order to improve S/N on the difference infrared image, infrared images in each of the voltage application state and the voltage application stopping state are detected plural times, and then a short circuit defect is detected from the difference infrared image between an overlapped image of plural infrared images at the voltage application state and an overlapped image of plural infrared images at the stopping state of voltage application, thereby the shortcircuit defect can be detected in more visualized state. Existence of the short circuit defect can be generally detected by comparing the difference infrared image obtained in such manner with the set threshold value.

Whether any short circuit defect exists or not within a thin film transistor liquid crystal substrate can be detected with high accuracy as above described, and from the view point of improving yield of the thin film transistor liquid crystal substrate, particularly the short circuit defect must be detected with the position being specified and then must be removed by the laser light. The pixel address with the short circuit defect occurring can be detected from difference or quotient between the infrared image outside the pixel domain at the state of applying voltage between the scan line and the signal line and the infrared image outside the pixel domain at the state of stopping the voltage application, and it can be easily detected to which position within the pixel address a defect occurs from the difference infrared image within the pixel address (when the heating quantity in the shortcircuit defect position is large) or from the visible image in the pixel address or the neighboring pixel address (when the heating quantity at the shortcircuit defect position is relatively small).

As above described, according to the present invention, various shortcircuit defects existing between a scan line and a signal line, between neighboring scan lines or between neighboring signal lines on a thin film transistor liquid crystal substrate can be detected rapidly in non-contact state with the substrate. Also according to the present invention, a shortcircuit defect position existing between a scan line and a signal line, between neighboring scan lines or between neighboring signal lines on a thin film transistor liquid crystal substrate can be detected rapidly at large S/N and in non-contact state with the substrate. Also according to the present invention, even in a thin film transistor liquid crystal substrate with an intersection between a scan line and a signal line or a thin film itself being pluralized, a pixel address with a shortcircuit defect existing is specified and then the shortcircuit defect position within the pixel address can be detected rapidly in non-contact state with the substrate. Further, according to the present invention, an inspection apparatus of a thin film transistor liquid crystal substrate is obtained where various inspection methods of a thin film transistor liquid crystal substrate can be easily implemented.

DETAILED DESCRIPTION OF THE PREFERRED EMBODIMENTS

Figure 1:
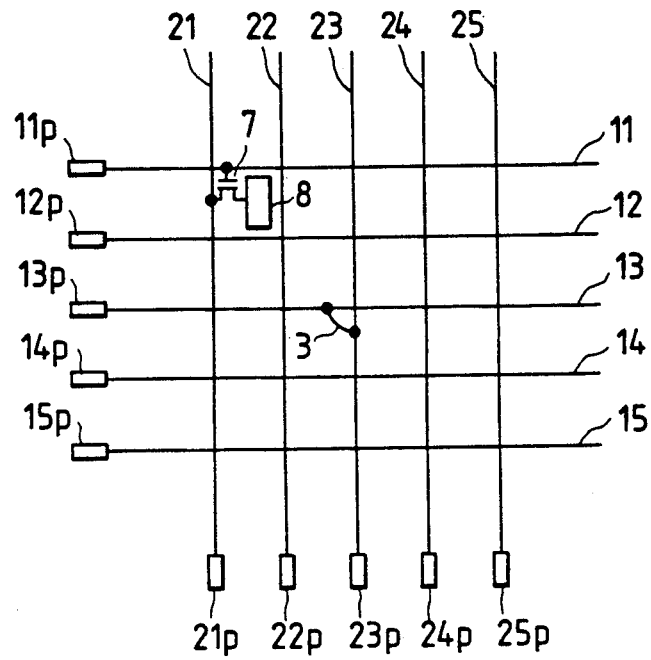
FIG. 1 is a diagram indicating a general example of electric wiring construction of a thin film transistor liquid crystal substrate.
Figure 2A:
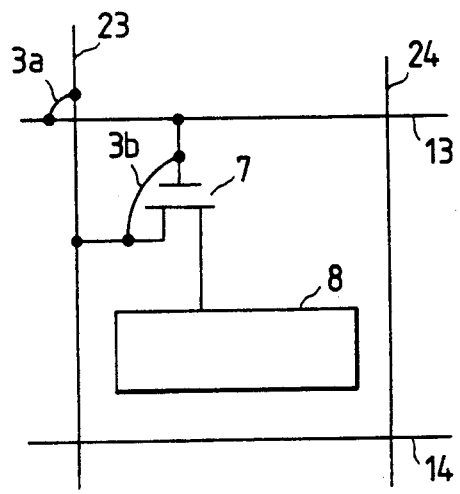
FIGS. 2(a)-2(b) are diagrams explaining sorts of shortcircuit defects and a shortcircuit defect correction method.
Figure 2B:
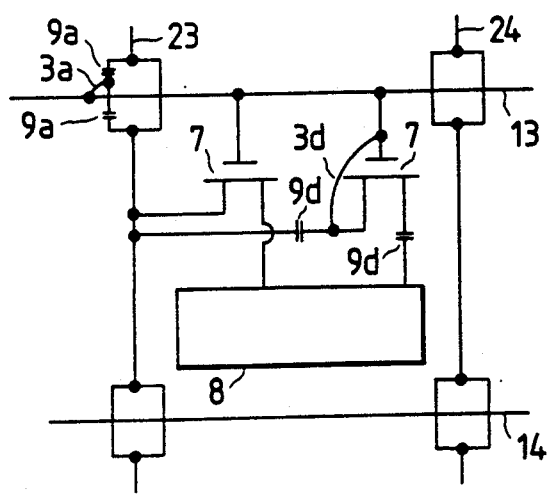
Figure 3:
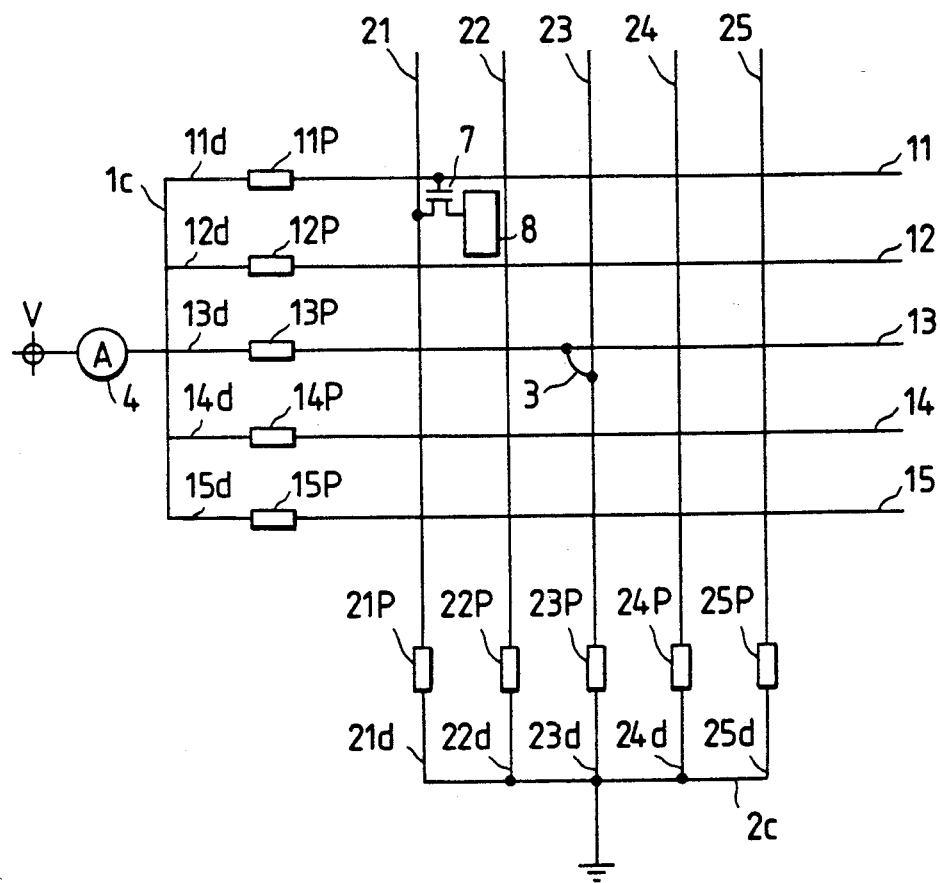
FIG. 3 is a diagram explaining an inspection method to confirm existence of a shortcircuit defect in the prior art.

At first, the theoretical background of the present invention will be described.

That is, on a thin film transistor substrate in normal state, since there is resistance of about several ten megaohms usually between a scan line and a signal line, even if voltage of about several ten volts is applied between the scan line and the signal line, little current flows there. On the contrary, if a shortcircuit defect exists between the scan line and the signal line, current flows in each of the scan line and the signal line through the shortcircuit defect part. In this case, since a resistance value at the shortcircuit defect part is larger than that at the normal wiring part in general, the shortcircuit defect part and its neighboring part are put on the heating state.

When an infrared image is detected, as disclosed in a reference [Principle of thermography apparatus "thermo viewer" and its method] (Japan Electron Optics Laboratory Co., Ltd. Product Information), the infrared picture image in appearance is obtained having brightness being an apparent temperature expressed by sum of product of emissivity (emissivity being defined by ratio of radiation energy of a body other than the black body to radiation energy of the black body in the same temperature) $\epsilon$ of the object and function R(T) of the real temperature T and product of reflectivity $1-\epsilon$ and the function R(T') of a temperature (room temperature usually) of a reflection source (ambient body), that is, $\epsilon \times R(T) + (1-\epsilon) \times R(T')$. Where the functions R(T), R(T') indicate effective incident intensity corresponding to the temperatures T, T' respectively.

As a value of the emissivity $\epsilon$, since glass has a value nearly equal to 1 and chromium or aluminium being a wiring pattern has a value nearly equal to 0, the image to be observed is liable to be affected by difference of the emissivity $\epsilon$. When temperature is equal in the object and the reflection source, value of the picture image is only dependent on the function R(T) and is independent of value of the emissivity $\epsilon$. When the temperature is not equal in the object and the reflection source, the value of the picture image is affected by difference of the emissivity $\epsilon$. The reflection source includes an objective in an infrared detector. If the temperature in the object and the reflection source can be made equal, since the value of the picture image is only dependent on the function R(T), it follows that the temperature of the object can be measured correctly. Consequently, in order to measure the temperature rise at the shortcircuit defect part, the difference infrared image may be detected from the infrared image before and after the voltage application. However, if the vicinity of the shortcircuit defect part is noticed, the temperature rise due to the thermal diffusion exists. That is, in the vicinity of the shortcircuit defect part, the temperature is not equal in the object and the reflection source, and the value of the image is not dependent on only the function R(T). As a result, in the difference infrared image detected from the infrared image before and after the voltage application, difference of the emissivity due to the location of the object appears and the image becomes as if the pattern were seen, and it becomes difficult to specify the shortcircuit defect part correctly from the difference infrared image.

As above described, in order to detect the heating position due to the shortcircuit defect with high accuracy, influence due to the difference of the emissivity dependent on the location of the object must be removed. According to the present invention, however, the influence due to the difference of the emissivity dependent on the object can be removed. Particularly after the voltage application is stopped, if the infrared image is detected within a short time, variation of brightness in the vicinity of the shortcircuit defect part caused by the thermal diffusion can be canceled. Detection of such image can obtain larger effect than that in the case of detecting the infrared image within the short time. That is, in the latter, the thermal conductivity is made high and the heat is conducted through the glass substrate and therefore the temperature in the vicinity of the shortcircuit defect part rises immediately. On the contrary, in the former, the thermal conductivity is made low and the heat diffused in the vicinity of the shortcircuit defect part is transmitted through an air and is not cooled immediately. Therefore if the infrared image is detected within the short time after applying the voltage, the temperature in the vicinity of the shortcircuit defect part is not varied significantly, thereby not only detection of the shortcircuit defect part but also the position rectifying can be carried out correctly.

An embodiment of the present invention will now be described referring to FIGS. 4(a)–4(c), 5–6, 7(a–7(b), and 8.

Figure 4A:
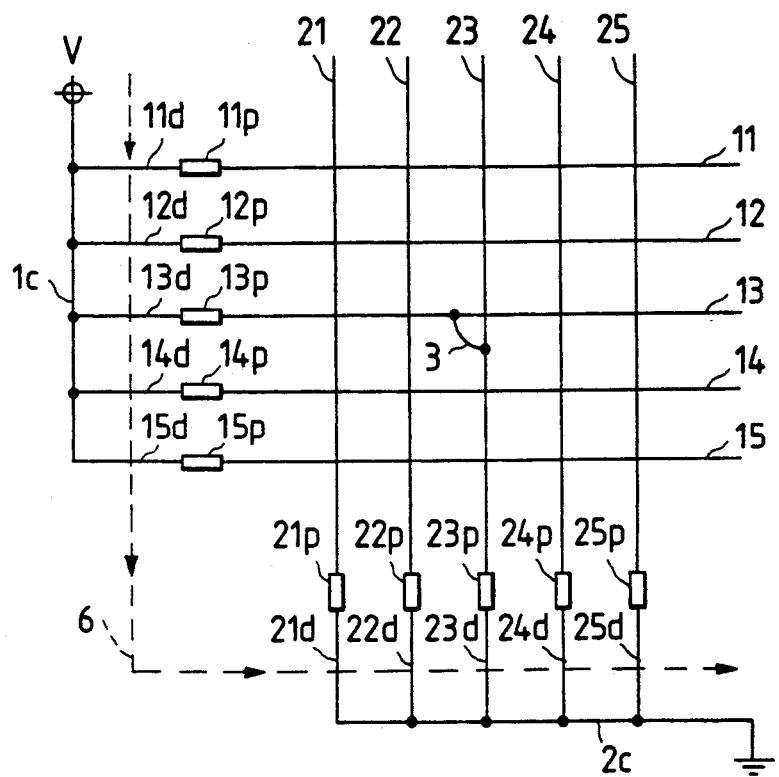
FIGS. 4(a)-4(b) are diagrams explaining a shortcircuit pixel address specifying method according to the invention.
Figure 4B:
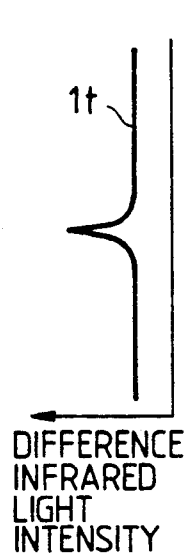
Figure 4C:
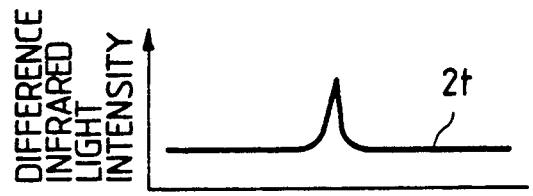

First, a method of specifying the shortcircuit pixel address will be described in detail referring to FIGS. 4(a)–4(c), In FIG. 4(b), a thin film transistor liquid crystal substrate is constituted in that scan lines 11-15 are electrically connected in common with external wirings 11d-15d formed on the outside of electrode terminal pads 11p-15p by a connection wiring 1c, and signal lines 21-25 are electrically connected in common with external wirings 21d-25d formed on the outside of electrode terminal pads 21p-25p by a connection wiring 2c. In such connection state, in order to supply voltage V between the scan lines 11-15 and the signal lines 21-25, if a probe for applying the voltage is contacted with the connection wirings 1c, 2c, as shown in FIG. 4, for example, when a shortcircuit defect 3 is produced in a pixel where the scan line 13 and the signal line 23 intersect, current flows through the external wiring 13d, the electrode pad 13p, the shortcircuit defect 3, the electrode terminal pad 23p and the external wiring 23d, and the wiring between the route is heated by the current. In this case, if the resistance value in the shortcircuit defect 3 is larger than that in the scan line 13 and the signal line 23, since the heat quantity between the route is large even if the current is quite small, the shortcircuit defect 3 can be detected. That is, for example, if the external wirings 11d-15d and the external wirings 21d-25d are detected along a broken line 6 before and after the voltage application by an infrared microscope and difference between the detected image signals is taken and the projection in the X, Y directions is calculated, position having larger value is detected from the difference signal waveform shown in FIGS. 4(a)–4(c), thereby the wiring position in the heating state, i.e., the scan line 13 and the signal line 23 can be detected. As a result, various shortcircuit pixel addresses in shortcircuit defect can be specified. In this case, in place of calculating difference between the image signals detected by the infrared microscope, the short circuit pixel address can be specified also by calculating quotient by division. In this embodiment, if N pieces of short circuit exist in the substrate, the detected scan lines and signal lines become N lines at maximum respectively.

Figure 5:
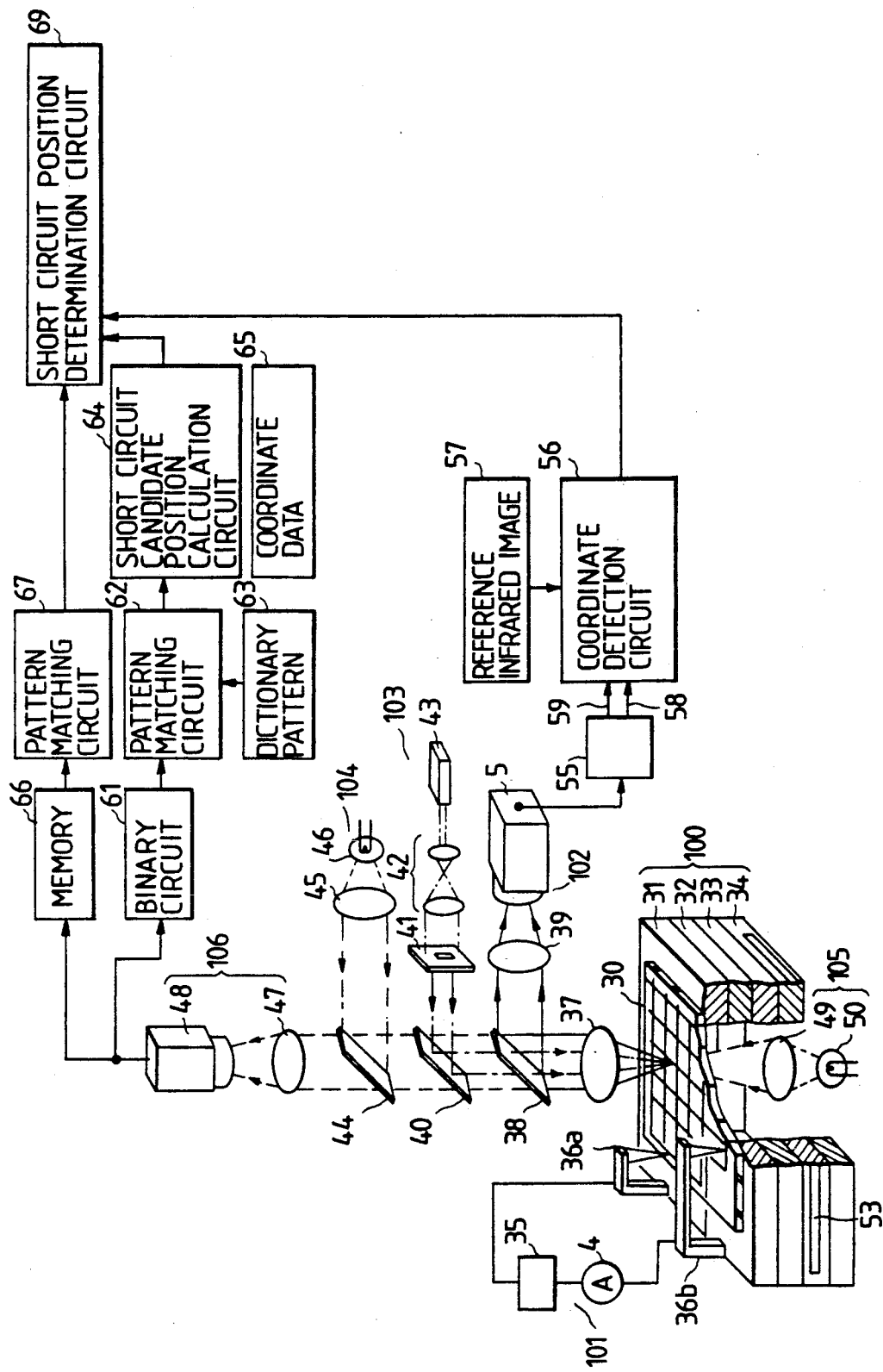
FIG. 5 is a diagram showing construction of an example of a thin film transistor liquid crystal substrate inspection apparatus according to the invention.

Constitution of the thin film transistor liquid crystal substrate inspection apparatus according to the present invention will be described. FIG. 5 shows constitution in an example. In this case, the present inspection apparatus is constituted broadly by a mechanism system 100, a voltage application system 101 and an optical system.

Among them, the mechanism system 100 comprises $\theta$ stage (rotational stage within the horizontal plane) 31, Z stage 32, X stage 33 and Y stage 34, and a thin film transistor liquid crystal substrate 30 is put on the $\theta$ stage 31 thereby the thin film transistor liquid crystal substrate 30 is positioned on any position within the optical visual field. The position of the X stage 33 can be detected by a position detector 53, and other stage 34 or the like can be detected similarly. Also the voltage application system 101 comprises a power source 35, a current meter 4 and probes 36a, 36b, and the probes 36a, 36b are contacted with the wiring pattern thereby potential difference is given between the scan line and the signal line, between the signal lines or between the scan lines.

On the other hand, the optical system comprises an infrared image detection processing system 102, a wiring cutting laser light irradiation system 103, a bright field illumination system 104, a transmission illumination system 105 and a visible image detection processing system 106. Among them, the infrared image detection system 102 comprises an objective 37, a dichroic mirror 38, a lens 39 and an infrared image detector 5, and infrared light (wavelength domain $\gamma_1$: about 3–13 $\mu$m, particularly about 3–5 $\mu$m or about 8–13 $\mu$m) emitted from the heating part on the thin film transistor liquid crystal substrate 30 is detected as infrared image. In the infrared image detection system, since the infrared image is enlarged by the objective 37, the infrared light emitted from a small domain of about 1–20 $\mu$m, i.e., intensity of the infrared light can be detected in good condition. Also the laser light irradiation system 103 comprises a laser oscillator 43, a beam expander 42 (including a moving mechanism not shown), an aperture 41 and a dichroic mirror 40, and the laser light transmitted through the aperture 41 is focused by the objective 37 and projected onto the thin film transistor liquid crystal substrate 30, thereby wiring pattern on a desired position, more concretely wiring pattern to form the shortcircuit defect, can be cut. In addition, correction of the shortcircuit pattern is not limited to the laser light, but it is clear that the energy beam such as the ion beam, the electron beam or the like may be used. Also the bright field illumination system 104 comprises a lamp 46, a lens 45 and a half mirror 44, and the thin film transistor liquid crystal substrate 30 is illuminated by visible light from the upper side through the objective 37. Further, the transmission illumination system 105 comprises a lamp 50 and a lens 49, and the thin film transistor liquid crystal substrate 30 is illuminated by visible light from the back side. Still further, the visible image detection system 106 comprises a visible image detector 48 and a lens 47. The visible image detector 48 is previously detected so as to detect a visible image at the same position as that of the infrared image detector 5 on the thin film transistor liquid crystal substrate 30. Also in the embodiment, the objective 37 must transmit light from the visible domain to the infrared domain, and ZnS or the like may be used in the glass material. Further, the dichroic mirror 38 is an optical element having characteristics of reflecting light in the detection wavelength domain $\gamma_1$ of the infrared image detector 5 and transmitting light with wavelengths less than the detection wavelength domain $\gamma_1$. Still further, the dichroic mirror 40 has characteristics of reflecting laser light with wavelength $\gamma_2$ ($\gamma_2 < \gamma_1$) from the laser oscillator 43 and transmitting visible light (wavelength domain $\gamma_3$: $\gamma_3 < \gamma_2$). This embodiment intends to realize the voltage application, the shortcircuit pixel address specifying and the wiring correction using one inspection apparatus.

The thin film transistor liquid crystal substrate inspection apparatus according to the present invention is constituted as above described, and its operation will now be described. In the thin film transistor liquid crystal substrate 30 put on the $\theta$ stage 31, the probes 36a, 36b are contacted with the wiring pattern thereby potential difference is given between the scan line and the signal line, and the image before giving the potential difference and the image after giving the potential difference are detected as the infrared image by the infrared image detector 5 through the objective 37.

Figure 10:
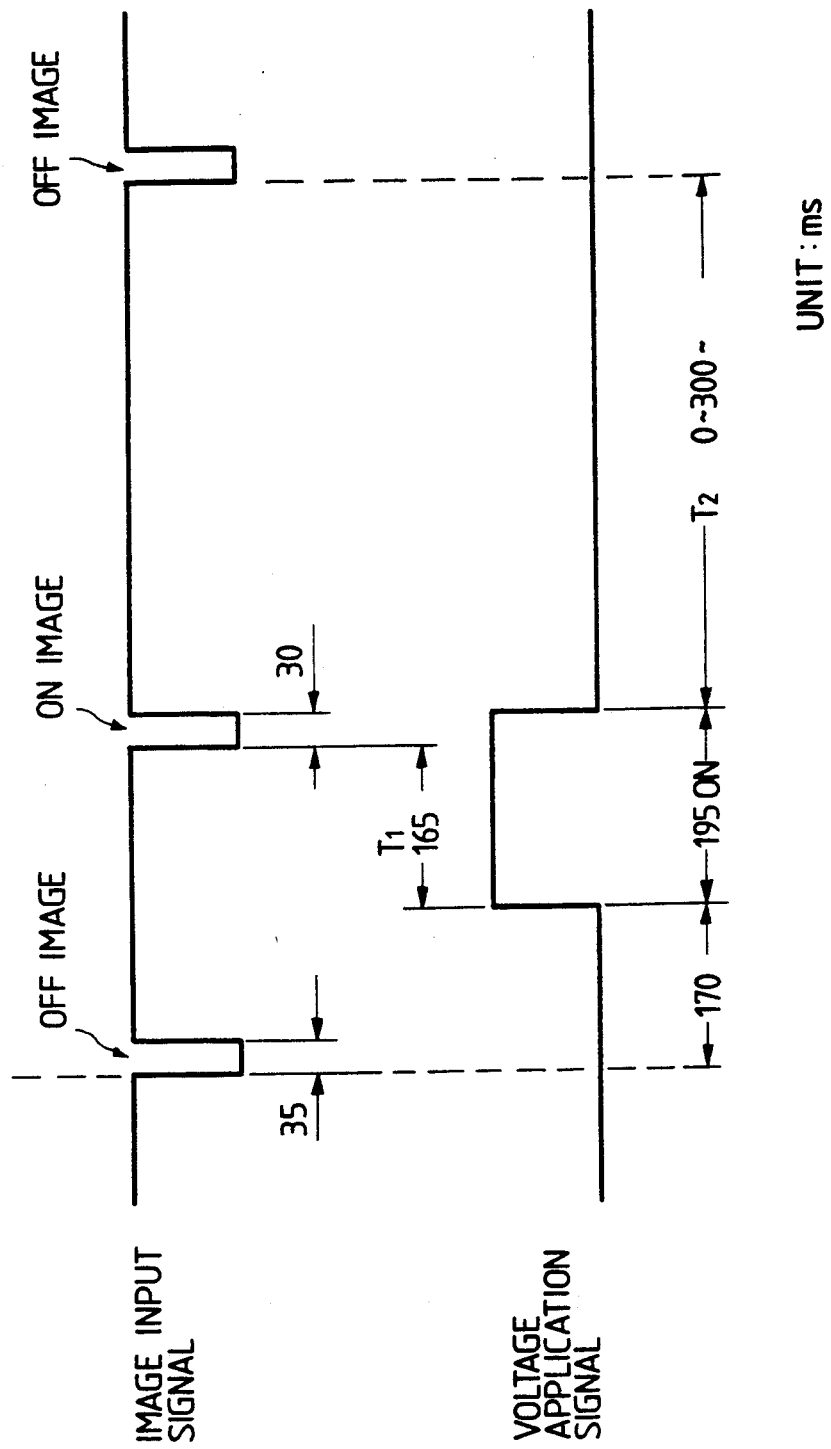
FIG. 10 is a diagram explaining an example of infrared image detection timing in the inspection apparatus shown in FIG. 5.

More concretely, infrared image at the voltage applied state is first detected after lapse of a prescribed time $T_1$ from the voltage application starting point, and on the other hand, infrared image at the stopping state of voltage application is detected after lapse of a prescribed time $T_2$ from the voltage application stopping point. As shown in FIG. 10, these prescribed times $T_1$ and $T_2$ are different in general and suitably set from a current value or a heating quantity being previously detected. For example, if the detected current value is large, both the heating quantity and the thermal diffusion quantity are large, therefore in such case, a relatively short time is set. Also if a plurality of short circuit defects occur, the current value becomes large. In the cases that the current value is large, at any rate, once the infrared image is detected and the heating quantity is evaluated in each of the short circuit defect parts, and then the prescribed times $T_1$ and $T_2$ may be suitably set. By the way, in FIG. 10, the prescribed times $T_1$, $T_2$ are set to 165 ms and 0–300 ms respectively.

Figure 11:
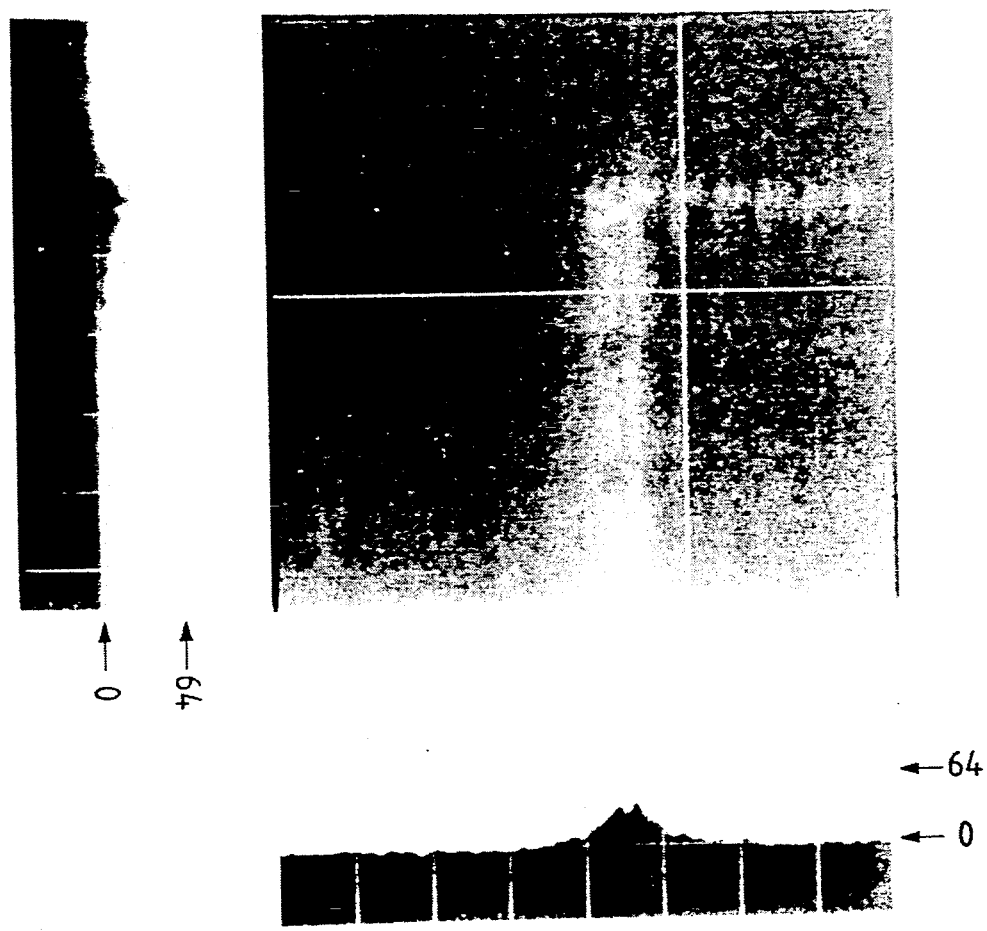
FIG. 11 is a diagram explaining qualitative feature of a difference infrared image based on infrared images detected by infrared image detection timing shown in FIG. 10.
Figure 12:
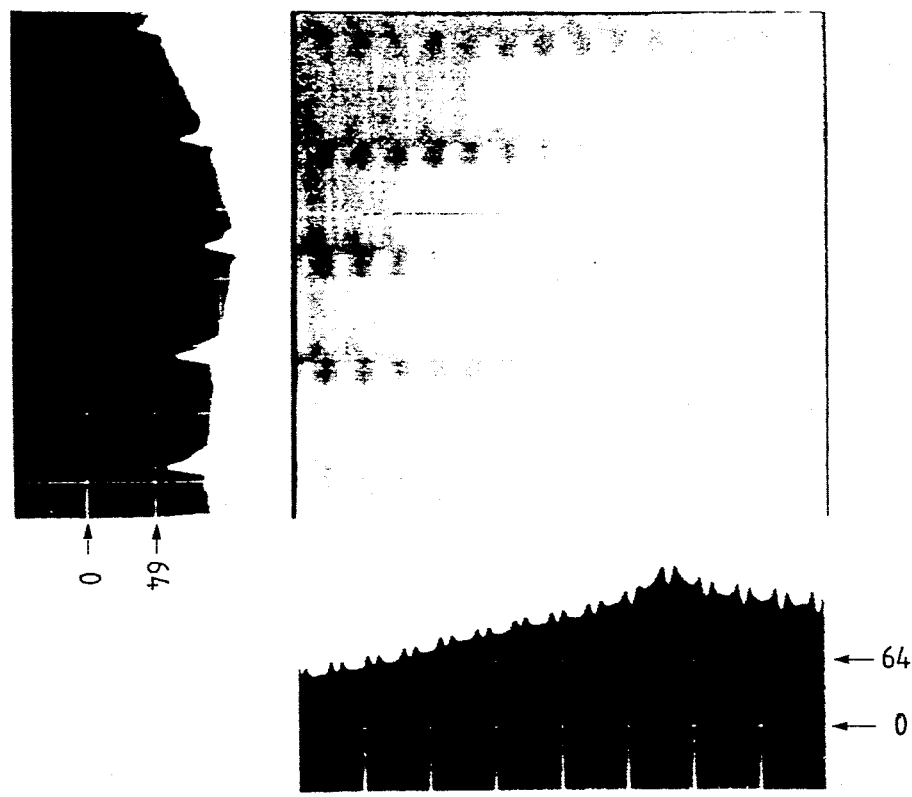
FIG. 12 is a diagram explaining qualitative malfunction of a difference infrared image based on infrared images detected not by infrared image detection timing shown in FIG. 10.

The infrared image detected by the infrared image detector 5 generally has a small S/N ratio, and in order to improve this, in the tuning state to the voltage application and the voltage application stopping, detection of the infrared image in each of the voltage application state and the voltage application stopping state is repeated, and difference (subtracted) infrared image is obtained from a plurality of overlapped infrared images in the voltage application state and a plurality of overlapped infrared images in the voltage application stopping state by the difference (subtracted) image detection circuit 55, and then the images may be processed in the coordinate detection circuit 56. FIGS. 11 and 12 show examples of detected difference (subtracted) infrared images in the case of tuning to the voltage application/stopping and detected difference infrared images in the case of not tuning thereto respectively, and it is seen that if the infrared images are detected within a short time after the voltage application is stopped, the influence due to the thermal diffusion can be canceled.

The description will be continued again returning to FIG. 5. In the coordinate detection circuit 56, the difference (subtracted) infrared images from the difference (subtracted) image detection circuit 55 are processed thereby position corresponding to the maximum in the difference (subtracted) infrared images can be detected. The position is detected, for example, as the position of the center of gravity in a domain surrounded by isothermal lines lowered by 0.2° C., or the difference (subtracted) infrared images are projected in the X, Y directions within the set domain and then the position may be detected as position of the center of gravity from the X, Y coordinates in each domain having a value being not less than the set value. However, when the position of the center of gravity are obtained from the X, Y coordinates in each domain having a value being not less than the set value, at the same time, corresponding to a plurality of shortcircuit defects, the generating position can be obtained as the position of the center of gravity. If a short circuit defect occurs within the pixel domain, after the shortcircuit defect pixel address is first specified, the shortcircuit defect position within the pixel address is specified, and then the shortcircuit defect removing processing is carried out for the position of the short circuit defect.

If the heating quantity in the short circuit defect part is sufficiently large, the short circuit defect can be specified easily, but if not so, the position can be specified from the visible image.

Figure 9:
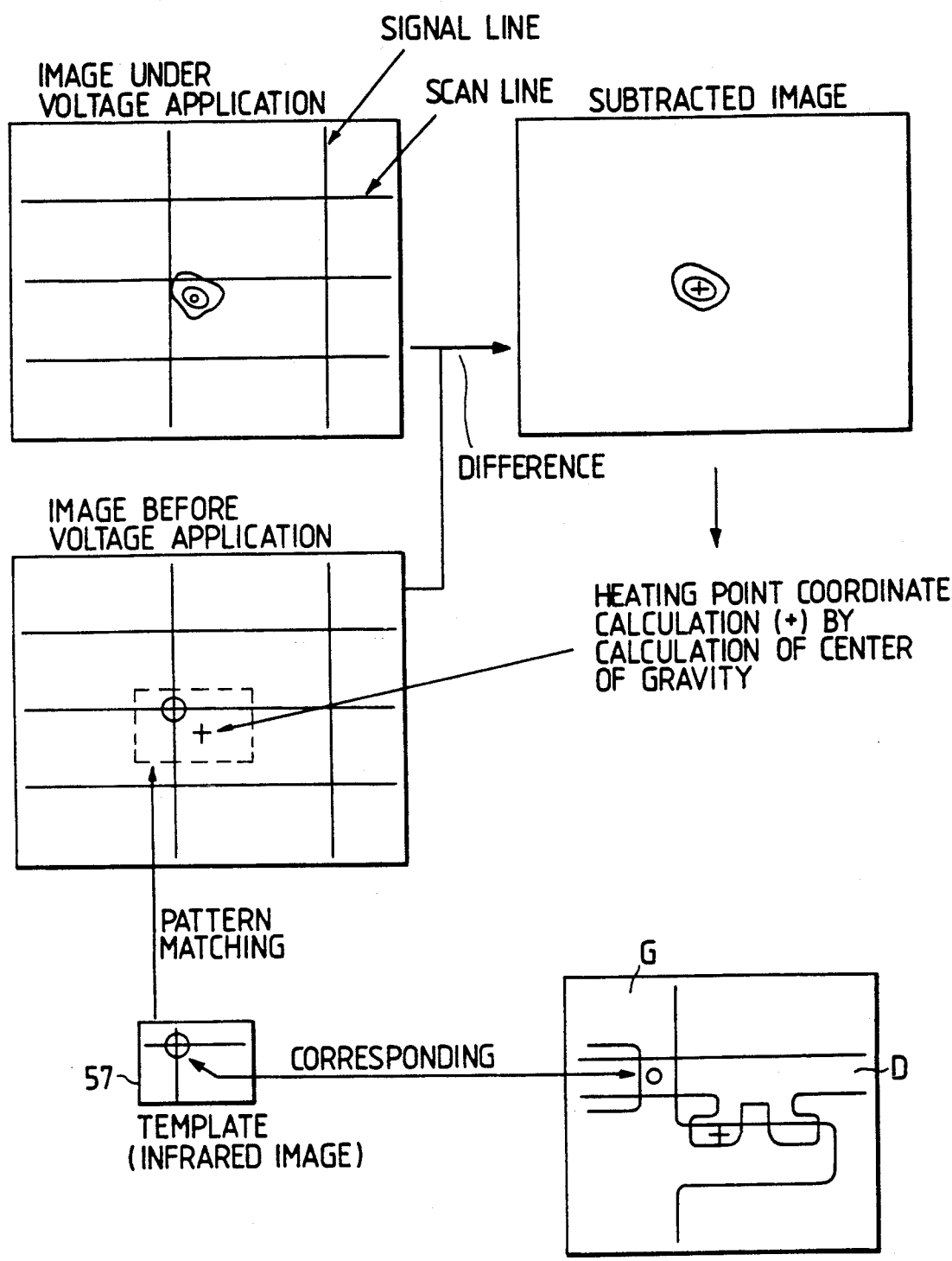
FIG. 9 is a diagram indicating a measuring method of a heating position.

Also, as shown in FIG. 9, matching is taken between a reference infrared image 57 and an infrared image before the voltage application, and the position is calculated as the X, Y coordinates from the specified positions such as intersections between the scan lines and the signal lines. Where numeral 58 designates a difference (subtracted) image, and numeral 59 designates an infrared image before the voltage application. For example, the matching can be realized as follows.

When an image before the voltage application is made f(x,y) and the reference image is made g(x,y), values $\Delta x$, $\Delta y$ are calculated so that value $P(\Delta x, \Delta y)$ in following equation becomes minimum.

$$P(\Delta x, \Delta y) = \Sigma\Sigma(f(x-\Delta x, y-\Delta y)-g(x,y))*(f(x-\Delta x, y\Delta-y)-g(x,y))$$

Where $\Delta x$, $\Delta y$ take values of $-2$, $-1$, 0, 1, 2 or the like. If the reference image g(x,y) is selected, for example, so as to represent the domain including the intersection between the signal line and the scan line, from the calculated $\Delta x$, $\Delta y$, it is seen that the intersection is located in the image before the voltage application. Thereby the current measurement becomes possible even if the image includes distortion. The reference image g(x,y) may be a transistor as cutting object. In the image, due to influence of the outside field and also difference of the emissivity of pattern, light and shade corresponding to the pattern are produced, thereby the correct matching can be realized. Also if the reference image g(x,y) is selected relatively small, it is not liable to be affected by difference of the distortion amount within the image.

On the other hand, an image detected by the visible image detector 48 during the transmission illumination is processed into binary digits by the binary circuit 61, and then pattern matching is carried out in the pattern matching circuit 62 between the processed image and a dictionary pattern from the dictionary pattern setting circuit 63, thereby the dictionary pattern position in the detected image is calculated. Based on the dictionary pattern position data, and coordinate data of the shortcircuit candidate position and the wiring cutting position previously set in the position coordinate data setting circuit 65, the shortcircuit candidate position and the wiring cutting position are calculated in the shortcircuit candidate position calculation circuit 64. On the other hand, an image detected by the visible image detector 48 during the bright field illumination is once stored in the memory 66, and then pattern matching is carried out in the pattern matching circuit 67 between the image within the shortcircuit defect pixel address and the image within the neighboring pixel address, thereby the pattern incompatible coordinates within the shortcircuit defect pixel address can be detected. In the shortcircuit position determination circuit 69, a shortcircuit candidate position being closest to the pattern incompatible coordinates calculated in the pattern matching circuit 67 is determined as the real shortcircuit position, thereby the wiring cutting position also is determined. Based on this, when the aperture 41 is positioned, laser light is irradiated from the laser oscillator 43 through the beam expander 42, thereby wiring can be cut at a desired position automatically and the shortcircuit defect can be corrected.

Outline of operation in the inspection apparatus of the thin film transistor liquid crystal substrate has been described, and now the operation will be described more concretely in detail as follows.

First, a specifying method of a shortcircuit defect pixel address will be described referring to FIGS. 4(a)-4(c). As shown in FIG. 4(b), scan lines 11-15 in the thin film transistor liquid crystal substrate are drawn through electrode pads 11p-15p to external wirings 11d-15d and then electrically connected in common by a connection wiring 1c. On the other hand, signal lines 21-25 also are drawn through electrode terminal pads 21p-25p to external wirings 21d-25d and then electrically connected in common by a connection wiring 2c. In such connection state, in order to apply voltage V between the scan lines 11-15 and the signal lines 21-25, if a probe for voltage applying is contacted to each of the connection wirings 1c, 2c, for example, when a shortcircuit defect 3 occurs in the pixel address where the scan line 13 and the signal line 23 intersect as shown in FIG. 4(b), current flows through the external wiring 13d, the electrode terminal pad 13p, the shortcircuit defect 3, the electrode terminal pad 23p and the external wiring 23d, and the wiring in this route is heated by the current. In this case, if the resistance value in the shortcircuit defect 3 is larger than that in the scan line 13 and the signal line 23, even if the current is quite small, as the heat quantity between the route is large, the shortcircuit defect 3 can be detected. That is, for example, if infrared images regarding the external windings 11d-15d and the external windings 21d-25d are detected along a broken line 6 by an infrared image detector 5 before and after the voltage application and then a difference infrared image of the detected infrared images is determined and the projection distribution to the X, Y directions is calculated, the wiring position having a larger value is detected from the projection distribution thereby the scan line 13 and the signal line 23 in the heating state can be detected. Thus various shortcircuit defect pixel addresses in shortcircuit failure can be specified, and in this case, in place of calculating the difference infrared image from the infrared images detected by the infrared image detector 5, quotient may be calculated by division thereby the shortcircuit pixel address can be easily specified. By the way, in the embodiment, if N pieces of shortcircuit exist within the substrate, the scan lines and the signal lines to be detected become N lines in the maximum respectively.

A method of specifying shortcircuit defects on a pixel address within a pixel domain has been described, and positions of shortcircuit defects between signal lines or between scan lines also can be easily specified. When the shortcircuit defects between signal lines or between scan lines are detected, voltage is applied between neighboring signal lines or between scan lines, but as the conditions are similar in any case, for simplifying the description, a method of detecting a shortcircuit defect between scan lines and a method of specifying its position will be described as follows.

When a shortcircuit defect between scan lines is detected, scan lines on odd number positions are commonly connected and also scan lines on even number positions are commonly connected, and voltage is applied between the scan lines on odd number positions and the scan lines on even number positions. If difference infrared images detected from infrared images outside the pixel domain at the voltage application state and infrared images outside the pixel domain at the stopping state of voltage application are projected to the X direction, in similar manner to a method of specifying a shortcircuit defect pixel address, from the projection distribution shape, two scan lines in the heating state can be detected as a pair in mutually neighboring state. From this, it is known that a shortcircuit defect occurs between the scan lines, and the occurring position can be easily specified, for example, from the shortcircuit defect position on the difference infrared image and the positioning state data of the thin film transistor liquid crystal substrate in this case. After the shortcircuit defect position is specified in such manner, a laser light is irradiated to the shortcircuit defect position, thereby the shortcircuit defect can be removed. Also regarding a shortcircuit defect between signal lines, its existence is detected and the shortcircuit defect position can be specified in similar manner, but the case between signal lines is significantly different from the case between scan lines in that from the projection distribution shape in the Y direction, the two signal lines in the heating state are detected as a pair in mutually neighboring state.

Figure 6:
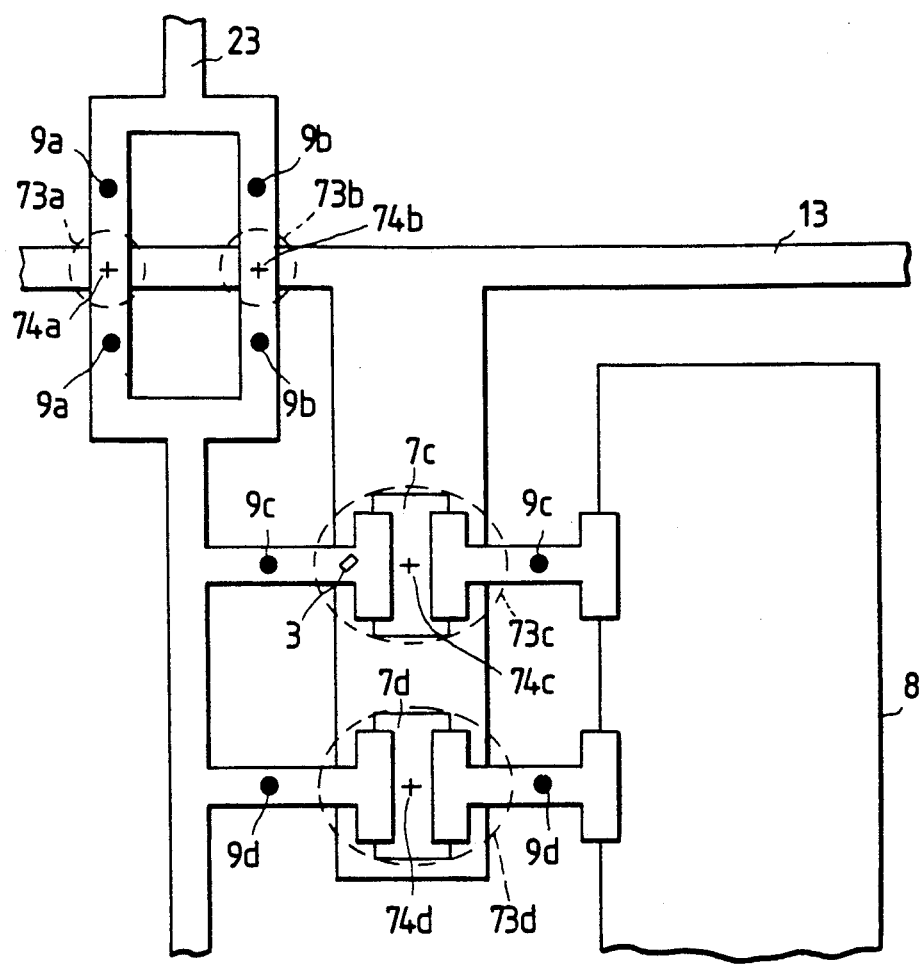
FIG. 6 is a diagram explaining a shortcircuit position specifying method, within a pixel.

Next, a method of specifying a short circuit defect position within the short circuit defect pixel address will be described. As shown in FIG. 6, in a thin film transistor liquid crystal substrate where an intersection part between a scan line and a signal line and a thin film transistor 7 itself are pluralized, a shortcircuit defect may occur in each of short circuit candidate domains 73a–73d. Consequently, when the wiring correction is carried out afterward, it must be specified in which of the shortcircuit candidate domains 73a–73d occurs a shortcircuit defect (shortcircuit position specifying). In a normal wiring, its resistance value is small, whereas in a shortcircuit defect part, in general, since resistance value is not so small, temperature rises a little due to a current. If this temperature rise is detected by the infrared detector 5, an image having a value of sum of value proportional nearly to product of emissivity $\epsilon$ and the second or fourth power of temperature T, i.e., product of function R(T) of the temperature T of the object and emissivity $\epsilon$ and product of the function R(Ta) of the ambient temperature and $(1-\epsilon)$ can be obtained. Regarding emissivity $\epsilon$, since glass has a value nearly equal to 1 and chromium or aluminium being a wiring pattern has a value nearly equal to 0, it is liable to be affected by the outside field and difference of the emissivity must be corrected. A resistance value in a normal wiring is small, whereas that in a short circuit defect part in general is not so small and a temperature rises a little in the part due to a current. Consequently, infrared images within the shortcircuit defect pixel address are detected before and after the voltage application in the above-mentioned procedure, and then an infrared image in difference (or quotient) between them is detected, thereby even delicate variation of the image state caused by the small heating in the shortcircuit defect part can be detected with high sensitivity. By the way, detection of the infrared image in difference (or quotient) in itself is that by which error of the infrared image detector 5 itself, for example, error of narcissus can be compensated simultaneously.

More concretely, assuming that the short circuit defect pixel address is already specified, every time the wiring pattern within the pixel address is positioned in sequence within the visual field of the infrared image detector 5, infrared images before and after the voltage application are detected. If the value in the infrared image in difference (or quotient) detected from the infrared images is equal to a set threshold value (previously determined value) or more, decision is effected that the heating position due to the short circuit defect exists within the pixel address, and then the short circuit defect position within the difference infrared image is detected. The shortcircuit defect position may be detected as the position of the center of gravity within the domain enclosed by isothermal line lowered by 0.2° C. for example from the position corresponding to the maximum value in the difference infrared image for example, or the difference infrared image is projected to the X, Y directions within the set domain and then the shortcircuit defect position may be detected as the position of the center of gravity from the X, Y coordinates in each of domains having value not less than the set value.

Then as shown in FIG. 9, matching is taken between the reference infrared image and the infrared image before the voltage application, and the X, Y coordinates from the specified position such as the intersection part between the scan line and the signal line are calculated. In such manner, even if a plurality of short circuit defects exist within the short circuit defect pixel address, the short circuit defect can be detected in the state that the position is specified. Besides the shortcircuit defect position coordinates in the difference infrared image calculated in such manner, the positioning coordinate data of the thin film transistor liquid crystal substrate may be used and the short circuit candidate domain with the shortcircuit defect occurring may be determined. Thereby it is seen that the short circuit defect 3 shown in FIG. 6 exists in the short circuit candidate domain 73c, and the wiring cutting position can be determined to 9c and the wiring cutting position may be cut. By the way, if the value in the subtracted infrared image is less than the set value, the shortcircuit defect position is specified by the visible image as hereinafter described, or decision is effected that the shortcircuit defect does not exist within the short circuit defect pixel address, and the shortcircuit defect position shall not be specified.

The temperature distribution of the heating part is in that the temperature decreasing gently corresponding to going away from the heating center. Consequently, in order to detect the infrared image, if the detection is carried out using the infrared image detector 5 with the sensitivity falling towards the periphery of the light receiving part, rather than the detector with the sensitivity being constant, the peak position of the heating center can be calculated more accurately.

In the subtracted infrared image within the field of view, besides the heating in the shortcircuit defect part, even if the heating in the scan line and the signal line occurring due to the shortcircuit defect part outside the subtracted infrared image within the field of view is detected simultaneously, by comparing the brightness in the subtracted infrared image end, the position of the shortcircuit defect part existing within the subtracted infrared image in the field of view can be detected accurately in the specified state.

Figure 13A:
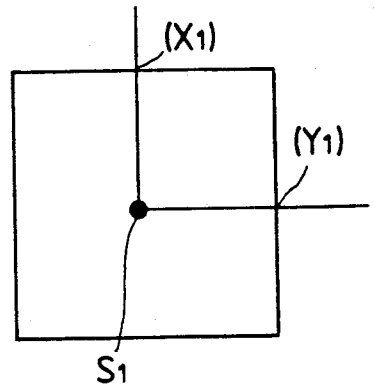
FIGS. 13 (A)-13(C) are diagrams explaining a processing method in specifying a shortcircuit defect position within a shortcircuit defect pixel, when a signal line image or a scan line image appears relatively significantly in a difference infrared image within the visual field.
Figure 13B:
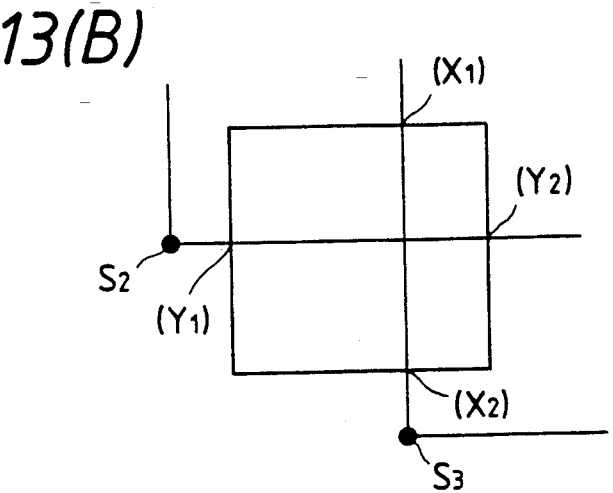
Figure 13C:
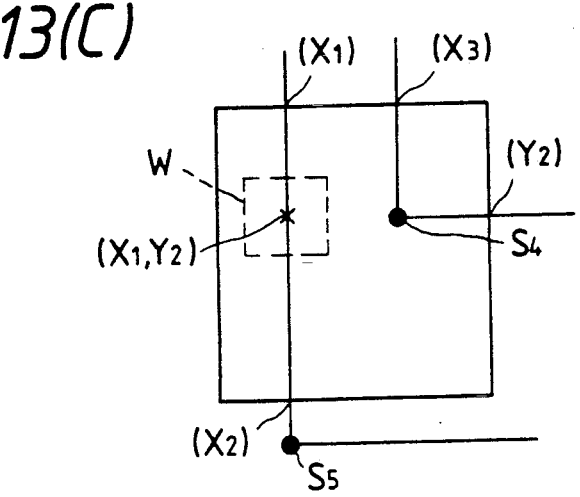

FIGS. 13(A)-13(C) show a behavior when brightness in the subtracted infrared image end within the field of view is compared. First, the case shown in FIG. 13(A) will be described. The subtracted infrared image within the field of view is shown as that within a rectangular display frame, and the image part (position coordinates $(X_1, Y_1)$) $S_1$ corresponding to the short circuit defect part is shown in the subtracted infrared image. Consequently, both the scan line image (one end position coordinates $Y_1$) with the image part $S_1$ being the intersection part and the signal line image (one end position coordinates $X_1$) are put on the heating state, but since both the scan line image and the signal line image are not extended in the other end directions and both other end position coordinates cannot be detected, this causes the image part $S_1$ to be identified due to the short circuit defect. Also in an example shown in FIG. 13(B), image parts $S_2$, $S_3$ corresponding to two short circuit defect parts exist in the vicinity of the subtracted infrared image within the field of view. In this example, both the scan line image with the image part $S_2$ being the intersection part and the signal line image with the image part $S_3$ being the intersection part appear in the subtracted infrared image within the field of view. Consequently, the end position coordinates for the scan line images in the subtracted infrared image within the field of view are calculated as $Y_1$, $Y_2$ and the end position coordinates for the signal line images are calculated as $X_1$, $X_2$, and the scan line image and the signal line image can be identified being due to the short circuit defect outside the subtracted infrared image within the field of view because $Y_1=Y_2$, $X_1=X_2$. Further in FIG. 13(C), an image part $S_4$ corresponding to the short circuit defect part exists in the subtracted infrared image within the field of view, and an image part $S_5$ corresponding to the short circuit defect part exists outside the subtracted infrared image within the field of view. Among them, regarding the image part $S_4$, since the condition is similar to that of the image part $S_1$ in FIG. 7(A), decision can be made that the image part $S_4$ is due to the short circuit defect. Regarding the signal line image with the image part $S_5$ being the intersection part, since end position coordinates are $X_1=X_2$, decision can be made that the signal line image is due to the short circuit defect outside the field of view. By the way, regarding whether the short circuit defect exists or not in the position coordinates $(X_1, Y_2)$, a window (shown by a broken line) is set in the state including the position coordinates $(X_1, Y_2)$ in the inside, and the above-mentioned decision may be repeated.

Further, in the above description, the image difference has been taken to correct the emissivity, but the design data for the emissivity may be prepared and calibrated by correction with the dimension and sensitivity of the detector, and the temperature can be determined accurately from one sheet of the image after the voltage application. Still further, if there is geometric strain in the detector, the wiring pattern in the signal line or the like can be detected and corrected.

The short circuit defect position can be specified in the above-mentioned manner, but it may be specified by the transmission illumination image. This specifying method will be described referring to FIGS. 7(a)-7(b). When a resistance value of the short circuit defect part is small, current due to the short circuit is sufficiently large and therefore the short circuit address can be specified using the external wiring. On the contrary, when the resistance value of the short circuit defect part is comparable with or less than the wiring resistance, the heating in the short circuit position is small and therefore the position cannot be detected using the infrared image. That is, the short circuit position in the pixel cannot be specified.

Next, a method of specifying the short circuit defect position in the short circuit defect pixel address by a visible image will be described. When a resistance value in the short circuit defect part is small, the current due to the short circuit is sufficiently large and therefore the short circuit defect pixel address can be specified using the external wiring. However, when the resistance value in the short circuit defect part is comparable with or less than the wiring resistance in the short circuit defect pixel, the heating at the short circuit defect position in the short circuit defect pixel address is small and therefore the short circuit defect cannot be detected even by the subtracted infrared image. That is, the short circuit defect position within the short circuit defect pixel cannot be specified. Also, in the case that the resistance value at the short circuit defect part is slightly larger than the wiring resistance within the short circuit defect pixel, the condition is similar. Consequently, when the short circuit pixel address is specified by the already described method and the decision is made that the shortcircuit defect exists more or less in the pixel address but the value in the difference infrared image is less than the set value, the position specifying of the short circuit defect by the visible image becomes effective. The position specifying of the short circuit defect by the visible image is not carried out actually, before such additional condition is satisfied concretely that the maximum value in the subtracted infrared image becomes $\alpha$ (e.g., $\alpha=2$) times of the brightness or less in the end part.

Figure 7A:
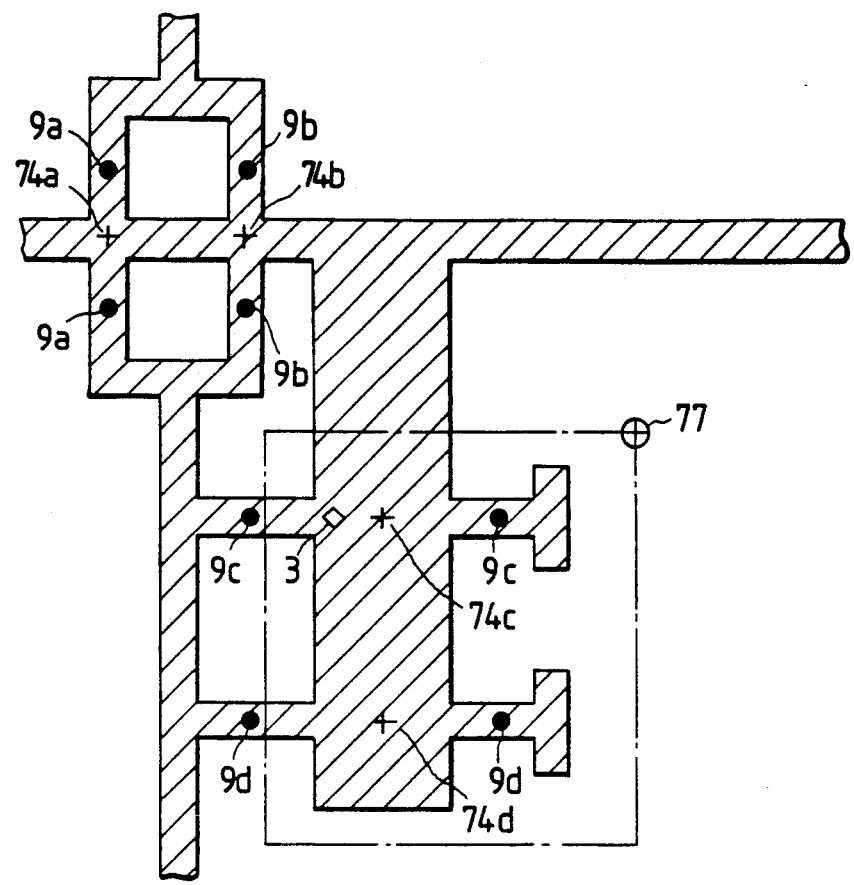
FIGS. 7(a)-7(b) are diagrams explaining a shortcircuit defect position specifying method by transmission illumination images.
Figure 7B:
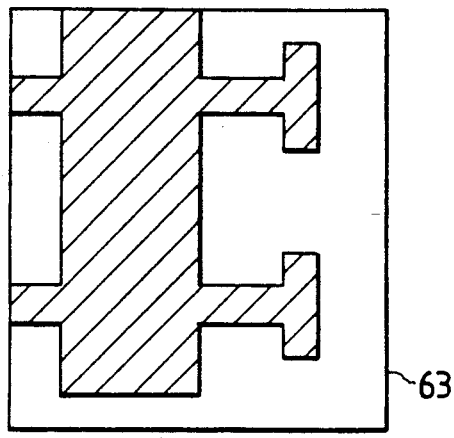

A method of specifying the short circuit defect position by the visible image will be described concretely. FIG. 7(a) shows a detection visible image in the transmission illumination state for the wiring pattern shown in FIG. 6. Since the transmission illumination is carried out from the back side of the thin film liquid crystal substrate, the wiring pattern of metal can be detected as a silhouette image, i.e. a binary image as shown in the figure. On the other hand, in the dictionary pattern setting circuit 63 as already described, a dictionary pattern shown in FIG. 7(b) is previously registered as a characteristic pattern, and in the position coordinate data setting circuit 65, short circuit candidate positions (corresponding positions of the short circuit candidate domains 74a–74d with the dictionary pattern position 77 as the origin and relative coordinate data of the wiring cutting positions 9a–9d are previously set. Consequently, if the dictionary pattern position 77 in the detection visible image is known, the short circuit candidate positions 74a-74d in the detection visible image and the wiring cutting positions 9a-9d also are determined unitarily. In the short circuit defect position specifying by the visible image, the wiring pattern within the short circuit defect pixel address is inspected in the state that the detection position is shifted in sequence, but the dictionary pattern position 77 in the detection visible image is varied in response to the positioning state of the thin film transistor liquid crystal substrate and is determined by the pattern matching by the image being detected in sequence with the dictionary pattern. That is, every time the visible image is detected under the transmission illumination state, by the pattern matching between the visible image being detected and the dictionary pattern, the position 77 is determined from the positioning coordinates in the state that the dictionary pattern is not coincident in the visible image. Consequently, from the position 77, the coordinate data of the short circuit coordinate positions 74a-74d and the wiring cutting positions 9a-9d in the visible image also can be calculated.

On the other hand, the short circuit defect position is determined from the visible image detected from the upper side, i.e., dark/light image in the embodiment. The pattern matching of the dark/light image pattern in the short circuit defect pixel address is carried out with that in the neighboring pixel address, thereby the coordinates in the non-coincident pattern part can be detected. More concretely, in the pattern matching, the dark/light image in each of the two pixel addresses adjacent to the short circuit defect pixel address can be detected in the state that the position is shifted by one pixel pitch in the lateral direction or the vertical direction from the short circuit defect pixel address. When the difference image is determined between each of the two sheets of the dark/light images and the dark/light image before the shifting, i.e., the dark/light image in the short circuit defect pixel address, and then the non-coincident pattern parts having a value of the set value or more are commonly detected from the two sheets of the difference images, the position coordinates in that part may be detected as the short circuit defect position. Thereby among the short circuit candidate positions 74a-74d, that minimizing the distance to the short circuit defect position is determined as the short circuit candidate position where the short circuit defect occurs actually. Thereby in similar manner to the embodiment already described, the short circuit 3 shown in FIG. 6 is discriminated to exist in the short circuit candidate domain 73c, and further the wiring cutting position 9c from the short circuit candidate domain 73c can be determined as a wiring cutting position. Thus in the embodiment, the coordinate data to be set and stored previously are made only the short circuit candidate positions 74a-74d and the wiring cutting positions 9a-9d when the dictionary pattern position 77 is made the origin, and the short circuit position can be easily specified. After the wiring cutting position is determined by the short circuit defect position specifying method as above described, the wiring cutting position is cut using energy beam such as laser light, thereby the short circuit defect can be removed and corrected. Although the visible image in the transmission illumination state has been used for the position detection of the wiring pattern in the above description, the position of the wiring pattern can be detected from the visible image in the bright field illumination state.

The present invention has been described, and it is clear that the invention can be applied also to the object other than the thin film transistor, which is accompanied by the heating due to any defect factor, so as to detect the existence of the defect and to specify the position.

Figure 8:
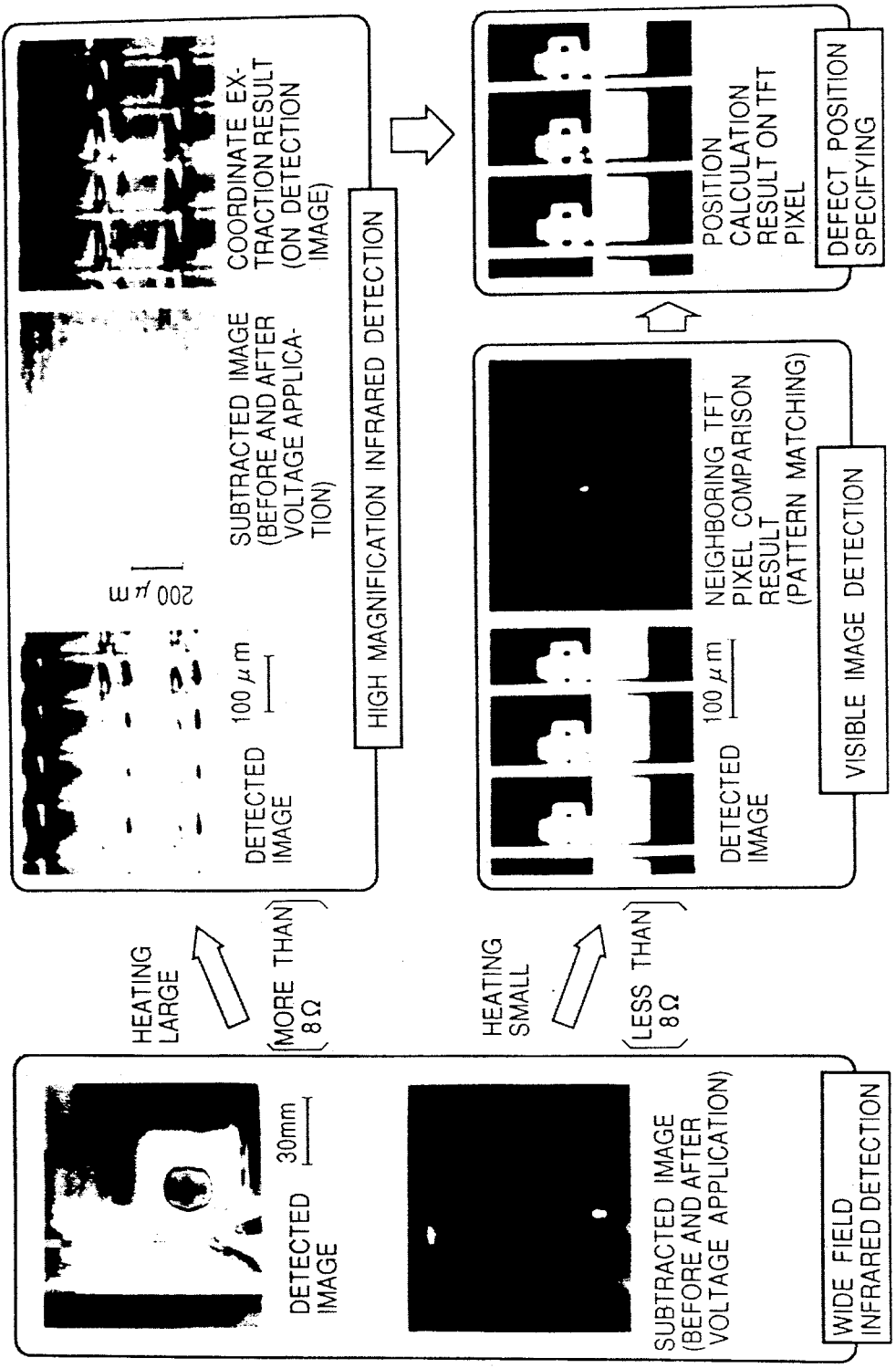
FIG. 8 is a diagram indicating an example of a detection image while specifying a short circuit pixel address.

Finally, FIG. 8 shows an example of a detection image when a shortcircuit pixel address is specified.

By the way, in the embodiment of the thin film transistor liquid crystal substrate inspection apparatus as above described, inspection of the short circuit defect and correction of the wiring are carried out using one apparatus, but it is needless to say that the defect inspection and the wiring correction may be implemented using separate apparatuses. Also, a short circuit defect between the signal lines or between the scan lines can be inspected in similar manner.

As above described, according to the present invention, various short circuit defects in the wirings of the thin film transistor liquid crystal substrate can be detected with high accuracy. Also, the contacting for the defect inspection is only the voltage application to the external wiring, and the inspection can be carried out without contacting the substrate body. Further, the shortcircuit defect position can be specified for the substrate where a plurality of thin film transistors or a plurality of intersection parts between scan lines and signal lines are formed to each pixel of the liquid crystal display, and the substrate with the short circuit defect existing can be easily corrected. As a result, various short circuit defects existing on the thin film transistor liquid crystal substrate can be detected rapidly with high sensitivity and without contacting the substrate, and if correction of the wiring is carried out concurrently with such inspection, a desirable effect is obtained in that yield of the thin film transistor can be significantly improved.

What is claimed is:

1. A method of inspecting a thin film transistor liquid crystal substrate and correcting defects thereon, the thin film transistor liquid crystal substrate including
   scan lines,
   signal lines intersecting with the scan lines without being connected thereto, intersections of the scan lines and the signal lines corresponding to pixels of the thin film transistor liquid crystal substrate,
   a transparent pixel electrode provided at each of the intersections of the scan lines and the signal lines, and
   a plurality of thin film transistors connected to each transparent pixel electrode and the scan line and the signal line associated therewith,
   wherein one of (1) each of the scan lines and (2) each of the signal lines is divided into a plurality of separate lines at each of the intersections of the scan lines and the signal lines;
   the method comprising the steps of:
   applying a voltage pulse between a scan connection terminal wiring connecting a plurality of the scan lines together in common and a signal connection terminal wiring connecting a plurality of the signal lines together in common;
   obtaining a first differential infrared image of the plurality of scan lines and the plurality of signal lines from a first infrared image of the plurality of scan lines and the plurality of signal lines obtained with an infrared image detection system during application of the voltage pulse and a second infrared image of the plurality of scan lines and the plurality of signal lines obtained with the infrared image detection system after application of the voltage pulse, the first differential infrared image being obtained by calculating one of (1) a difference between the first infrared image and the second infrared image and (2) a quotient of the first infrared image and the second infrared image, the first differential infrared image showing a difference between a heating state of the plurality of scan lines and the plurality of signal lines during application of the voltage pulse and a heating state of the plurality of scan lines and the plurality of signal lines after application of the voltage pulse caused by a current pulse flowing between one of the plurality of scan lines and one of the plurality of signal lines through a short circuit defect existing between the one scan line and the one signal line at the intersection of the one scan line and the one signal line;

specifying the intersection at which the short circuit defect exists based on the first differential infrared image and position data detected by position detecting means representing a position of the thin film transistor liquid crystal substrate;

obtaining a second differential infrared image of a vicinity of the intersection at which the short circuit defect exists from a third infrared image of the vicinity obtained with the infrared image detection system during application of the voltage pulse and a fourth infrared image of the vicinity of the intersection at which the short circuit exists obtained with the infrared image detection system after application of the voltage pulse, the second differential infrared image being obtained by calculating one of (1) a difference between the third infrared image and the fourth infrared image and (2) a quotient of the third infrared image and the fourth infrared image, the second differential infrared image showing a difference between a heating state of the vicinity of the intersection at which the short circuit exists during application of the voltage pulse and a heating state of the vicinity of the intersection at which the short circuit exists after application of the voltage pulse caused by the current pulse flowing between the one scan line and the one signal line through the short circuit defect;

calculating a displacement of a position at which the short circuit defects exists relative to a predetermined position in the vicinity of the intersection at which the short circuit exists by extracting coordinates of the position at which the short circuit defect exists in an infrared image coordinate system from the second differential infrared image and calculating a difference between the extracted coordinates of the position at which the short circuit defect exists in the infrared image coordinate system and coordinates of the predetermined position in the infrared image coordinate system based on pattern matching between the fourth infrared image and a reference infrared image including the predetermined position;

determining at least one cutting position at which it is necessary to cut at least one of the separate lines and the thin film transistors at the intersection at which the short circuit exists to eliminate the short circuit defect based on the displacement of the position at which the short circuit defect exists relative to the predetermined position and a visible image of the vicinity of the intersection at which the short circuit exists including the predetermined position obtained with a visible image detection system having an optical axis coinciding with an optical axis of an energy beam irradiation system; and eliminating the short circuit defect by cutting the at least one of the separate lines and the thin film transistors at the at least one cutting position by irradiating an energy beam on the at least one cutting position from the energy beam irradiation system.

2. A method according to claim 1, wherein if the intersection at which the short circuit defect exists cannot be specified based on the first differential infrared image and the position data, the step of specifying the intersection at which the short circuit defect exists specifying the intersection at which the short circuit defect exists based on a visible image of a wiring pattern of the thin film transistor liquid crystal substrate obtained with the visible image detection system and the position data.

3. A method according to claim 1, wherein a detection sensitivity of the infrared image detection system falls off toward a periphery of a light receiving portion of the infrared image detection system.

4. A method according to claim 1, wherein in the step of obtaining the first differential infrared image, the first and second infrared images are obtained by obtaining first and second scan line infrared images of the plurality of scan lines between the scan connection terminal wiring and an area of the thin film transistor liquid crystal substrate in which the intersections of the plurality of scan lines and the plurality of signal lines occur, and first and second signal line infrared images of the plurality of signal lines between the signal connection terminal wiring and the area of the thin film transistor liquid crystal substrate in which the intersections of the plurality of scan lines and the plurality of signal lines occur.

5. A method according to claim 4, wherein the step of obtaining the first differential infrared image includes obtaining a differential scan line infrared image from the first and second scan line infrared images and obtaining a differential signal line infrared image from the first and second signal line infrared images, and wherein the step of specifying the intersection at which the short circuit defect exists includes projecting intensity distributions of the differential scan line infrared image and the differential signal line infrared line in X and Y directions of the thin film transistor liquid crystal substrate.

6. A method according to claim 1, wherein if the coordinates of the position at which the short circuit defect exists in an infrared image coordinate system cannot be extracted from the second differential infrared image, the step of calculating the displacement of the position at which the short circuit defect exists includes calculating the displacement of the position at which the short circuit defect exists by extracting coordinates of the position at which the short circuit defect exists in a visible image coordinate system based on a non-coincident pattern in a difference image obtained by comparing a first dark/light image of the vicinity of the intersection at which the short circuit exists obtained with the visible image detection system with a second dark/light of the vicinity of the intersection at which the short circuit exists obtained with the visible image detection system, the second dark/light image being shifted by one pixel with respect to the first dark/light image, and calculating a difference between the extracted coordinates of the position at which the short circuit defect exists in the visible image coordinate system and coordinates of the predetermined position in the visible image coordinate system.

7. A method of inspecting a thin film transistor liquid crystal substrate comprising the steps of:

connecting a plurality of scan lines and a plurality of signal lines electrically in common at respective terminals;

detecting an infrared image of the scan lines and the signal lines outside a pixel area of the thin film transistor liquid crystal substrate after lapse of a prescribed time from a time point of applying voltage between said scan lines and said signal lines;

detecting an infrared image of the scan lines and the signal lines outside the pixel area after lapse of a prescribed time from a time point of stopping the voltage application;

detecting scan lines and signal lines exhibiting variation of a heating state from a differential infrared image obtained by taking one of a difference and a quotient between the infrared image at the voltage applying state and the infrared image at the stopping state of a voltage application, so that a pixel address with a short circuit defect occurring is specified, wherein if an image part being equal to at least a set threshold value does not exist in the differential infrared image at the pixel address, a wiring pattern position at the pixel address is detected from a visible image at the pixel address and a wiring pattern at the pixel address is compared with a wiring pattern at a neighboring address to detect a short circuit defect position.

8. An apparatus for inspecting a thin film transistor liquid crystal substrate, comprising:

a stage system for holding the thin film transistor liquid crystal substrate, with X, Y, Z direction positions and a rotational position $\theta$ in an XY horizontal plane being in an arbitrary state, so as to enable optical detection of an image at an arbitrary position on the thin film transistor liquid crystal substrate;

a voltage applying system for applying a voltage between any one of (1) a scan line and a signal line, (2) scan lines, and (3) signal lines in the thin film transistor liquid crystal substrate held by said stage system;

an illumination system for illuminating the thin film transistor liquid crystal substrate with a visible light so as to enable detection of a wiring pattern at an arbitrary position on the thin film transistor liquid crystal substrate held by said stage system;

an infrared image detection processing system for detecting an infrared image at an arbitrary position on the thin film transistor liquid crystal substrate held by said stage system, after lapse of respective prescribed times from a voltage application starting point and a voltage application stopping point, and for performing prescribed image processing so as to specify existence of a short circuit defect, a pixel address at which the short circuit defect occurs, and a short circuit defect position in the pixel address at which the short circuit defect occurs; and a visible image detection processing system for detecting a wiring pattern as a visible image at an arbitrary position on the thin film transistor liquid crystal substrate held by said stage system, and for performing prescribed image processing so as to specify a short circuit defect position in the pixel address at which the short circuit defect occurs.

9. An apparatus according to claim 8, further comprising short circuit defect correction means for irradiating an energy beam to the specified short circuit defect to remove the short circuit defect.

* * * * *